UNITED STATES PATENT OFFICE.

FREDERICK L. RAWSON, OF LONDON, ENGLAND, ASSIGNOR TO THE COMPANY WOODHOUSE & RAWSON UNITED, LIMITED, OF SAME PLACE.

METHOD OF IMPREGNATING PARTS OF ELECTRICAL APPARATUSES.

SPECIFICATION forming part of Letters Patent No. 437,044, dated September 23, 1890.

Application filed January 29, 1890. Serial No. 338,507. (No specimens.)

*To all whom it may concern:*

Be it known that I, FREDERICK LAWRENCE RAWSON, a subject of the Queen of England, and a resident of London, England, have invented certain new and useful Improvements in the Method of Impregnating parts of Electrical Apparatuses, of which the following is a specification.

My invention relates to a new and improved method of preparing a compound to be used for the bases of electrical instruments, casing or conduits for conductors, and generally those parts of electrical apparatus or machinery where insulation is required.

My compound or composition consists of hydraulic cement made into a paste with suitable liquid or liquids in conjunction with a suitable proportion of plaster-of-paris or similar close-grained powder which may have the effect of producing a suitable closeness of grain and may counteract the tendency to shrink, which generally occurs with most cements, and in some cases a silicious powder—such as sand—may be added, in order to produce a suitable degree of hardness. The cements and liquids to be selected will produce a material which shall not harden too rapidly, and which when dry shall possess a suitable degree of porosity to admit a thorough impregnation of the molded articles with a heavy oil or molten resin, hydrocarbon, or other analogous substances having a high melting-point. This saturation may be either effected by dipping or by forcing the material or materials above mentioned into the pores under pressure from a force-pump or the use of a vacuum-chamber.

In order to make my invention more clearly understood, I will describe by way of example a compound and the treatment of the same after molding as prepared by me, and which I would prefer to employ in most cases.

I first intimately mix about six parts, by measure, of Portland cement with one part of plaster-of-plaster, and with sufficient water to convert the mixture into a paste suitable for molding under addition of a proportion of clean sand. I mold this paste to the form desired, coring in it such holes as may be necessary for bolts or other attachments, and molding in it such metal parts as may have to be permenently attached to it. After the material has set in the mold I remove it and expose it to be dried slowly at a moderate temperature during ten days or more, the time depending on the mass that has to be dried and the degree of hardness required. The molded article may be further hardened by immersing it for a day or more in a solution consisting of equal parts of silicate of soda or potassium and water. When the molded article is sufficiently dry and hard, I heat it to about 105° or 110° centigrade and then submerge it in a bath of molten ozocerite or paraffine-wax, or material which is the heavy oil or residue of distillation of paraffine-petroleum. When the molten material has cooled down to about 95° centigrade, I remove the molded article from the bath and clear it of the superfluous matter adhering to it.

In making boxes or tanks which cannot be conveniently immersed in a bath of the impregnating material I provide a closed metal vessel that can be put inside the molded article, leaving a space all around it to receive the impregnating material. I charge this vessel with steam at a temperture of 105° to 110° centigrade, whereby the impregnating material may be kept in a liquid condition as it soaks through the thickness of the box or tank. The article thus impregnated with the oily matter is hard, strong, tough, and incombustible and has high electrical resistance, so that it forms a good insulator, and, being protected againt access of moisture, it permanently retains its insulating and other properties.

Among the substances mentioned for impregnating I have particularly mentioned such of high melting-point; but I wish it to be understood that also such oily matter or solutions of resins in oil which become hard under the influence of the atmosphere may be successfully employed without departing from my invention.

Having thus fully described my invention, what I claim, and desire to secure by Letters Patent, is—

The method of preparing bases and other insulating parts of electrical apparatus, consisting of hydraulic cement molded to shape, which consists in the impregnation of the same from inside with heavy oily or resinous matter by putting a closed heated vessel inside the molded article in such a manner that spaces are left all around it to receive the impregnating substance, substantially as and for the purpose specified.

In testimony that I claim the foregoing as my invention I have signed my name, in presence of two witnesses, this 30th day of November, 1889.

F. L. RAWSON.

Witnesses:
HUGH HUGHES,
EDMUND S. SUEWIN.